Dec. 27, 1949  A. STAUFFER  2,492,600
WEEDER FOR POTATO HARVESTERS AND THE LIKE
Filed May 22, 1947
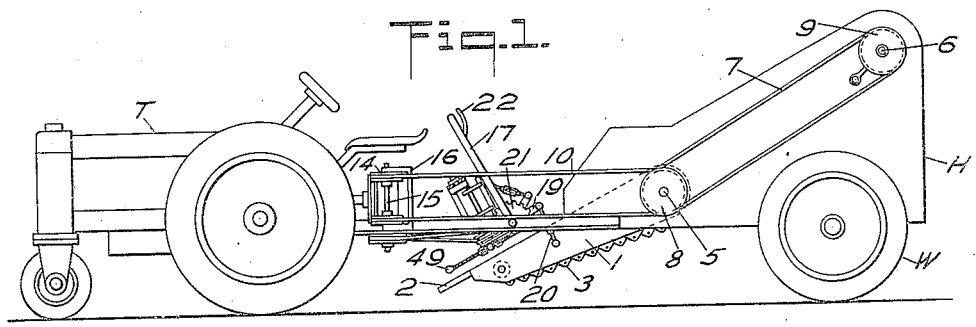
INVENTOR
ALFRED STAUFFER
BY
ATTORNEY Patented Dec. 27, 1949

2,492,600

UNITED STATES PATENT OFFICE 2,492,600

WEEDER FOR POTATO HARVESTERS AND THE LIKE

Alfred Stauffer, Honey Brook, Pa.

Application May 22, 1947, Serial No. 749,777

2 Claims. (Cl. 55—51)

This invention relates to weeders and more especially to one for removing the stems, vines and roots of potato plants from the potato tubers themselves as the latter are dug from the ground by a mechanical harvester for subsequent separation from the soil in which they grow. Thus the primary utility of the weeder is realized when it is employed as an attachment or auxiliary device for a farm implement or machine designed for harvesting crops from which plant parts such as stems, vines and feeding roots are to be removed and discarded, particularly so-called "root crops" as distinguished from those crops in which the elements to be harvested grow above the ground, since the weeder is designed to effect substantial destruction and relatively violent ejection of the above-ground plant parts in the former type of crop.

It is consequently a principal object of the invention to provide a novel weeder adapted for embodiment in or attachment to a potato harvester or the like for removing unwanted plant parts and ejecting all or at least the major portion of them from the harvester.

A further object is to provide a weeder of this character adapted to be driven either independently or from the harvester power drive and which is automatically operative to whip or flail the vines and weeds from the soil as the harvester moves over the ground, preferably just as the harvester plow raises the soil and plants prior to segregation of the potato tubers themselves.

Another object is to provide a weeder in which the flailing weeder element may be adjusted to disintegrate and partially pulverize the soil crust in addition to removing weeds and vines and thereby facilitate subsequent separation of the root crop from the soil.

Other objects, purposes and advantages of the invention will hereafter more fully appear or will be understood from the following description of one embodiment of it wherein reference will be had to the accompanying drawing, in which:

Fig. 1 is a side elevation of a potato harvester operatively assembled with a tractor and including a weeder embodying my invention;

Fig. 2 is an enlarged fragmentary top plan view of the harvester unit and weeder alone;

Fig. 3 is a similarly enlarged fragmentary side elevation partly in vertical section showing the weeder and associated mechanism in greater detail; and Fig. 4 is a top plan view on the same scale as the two preceding figures of the flail element of the weeder alone.

While in the drawing the weeder of my invention is shown in operative association and combination with a potato harvester H of a more or less common type designed to be drawn by a tractor T to which the front end of the harvester is secured by a hitch (not shown) while its rear end is supported from a pair of rubber tired wheels W, it will be understood the weeder is adapted for attachment to or incorporation in substantially any type of harvester or the like operating in accordance with the same general principles as that illustrated; it may also sometimes be useful in association with soil conditioning apparatus to assist in clearing the ground, as in the preparation of a seed bed, rather than during the harvest alone.

More specifically, the potato harvester H comprises a vertically adjustable plow carrier 1 having at its forward end a pointed plow 2 adapted to enter the ground and progressively raise the earth and potatoes for deposition upon a moving endless conveyor belt 3 as the harvester travels along the row. The belt, formed by a plurality of spaced parallel rods linked together at their ends, is inclined upwardly and rearwardly and carries the potatoes after separation from the vines, debris and soil to a suitable point of discharge, preferably in accordance with the disclosure of my pending application for United States Letters Patent for Potato harvester, Serial No. 737,746, filed March 28, 1947.

As more fully explained in said application, the conveyor belt carries the marketable potatoes upward and rearward while particles of earth and the like fall from them to the ground through the interstices between the rods of the belt, which is continuously driven by pairs of sprockets on spaced transverse shafts 5, 6 connected through a V-belt 7 running over pulleys 8, 9 on the respective shafts. Another belt 10 desirably running in an outer groove of pulley 8, which is thus a double one, drives shaft 5 from a pulley 12 on a jack shaft or power take-off 13 projecting from the rear end of the tractor, and as jack shaft 13 extends substantially at right angles to conveyor shafts 5, 6 between pulleys 8 and 12, belt 10 is carried over a pair of spaced "mule" pulleys 14 one of which is rotatable on a vertical shaft 15 carried by a bracket 16 on the harvester frame while the other is secured to and rotates with this shaft. The elevation of the plow is adjusted by a hand lever 17 operating a transverse elevator shaft 18 connected to the plow carrier 1 by a crank arm 19 and adjustable link 20; a quadrant 21 engaged by a detent (not shown) actuated by a hand trigger 22 enables the lever to be releasably latched at a selected position to hold the plow either raised above the ground and thus inoperative, as shown in the drawing, or lowered about the axis of shaft 5 so as to extend into the ground to the depth necessary for digging the potatoes.

Referring now more particularly to the weeder which, as stated, is associated with the harvester for the purpose to which reference has been made, adjacent and above the forward end of the plow carrier the harvester main frame members M support a transverse weeder frame comprising a main cross bar 23 welded at its ends to members M and having welded to it adjacent its center an upstanding inverted rectangular generally U-shaped bracket 24, and secured to this frame substantially on the center line of the harvester above the plow is a stationary main carrier tube 25 extending upwardly and forwardly and welded or otherwise secured to cross bar 23 and bracket 24. The ends of this tube are belled to provide seats for the outer races of a pair of antifriction bearings 27, 28 and an inner tube or sleeve 29 rotates in these bearings and is held against axial translation therein by a collar 30 and pulley 31 at its upper and lower ends respectively, the pulley also affording means for rotating the sleeve in its bearings when driven by a V-belt 32 running over a driving pulley 33 secured at the lower end of the mule pulley shaft 15.

The flail element hereinafter more fully described is disposed at the lower end of a weeder shaft 35 feather-keyed to and slidable in sleeve 29 and for regulating the spacing between the element and the subjacent plow, means are provided for effecting axial adjustment of the shaft in the sleeve. Said means, as shown, comprise a grooved member on the lower end of the shaft, the member being either a separate collar or the hub 37 of the flail element, as shown, and a fork 38 embracing the member in its groove and supported at the lower end of a spring pressed rod 39 slidable in a slotted tube 40 affixed to the weeder frame, the rod having a lug 41 projecting through the tube slot and connected by means of an adjustable link 42 with an arm 43 on the plow elevating shaft, a spring 44 on rod 39 constantly biasing the fork and shaft 35 downwardly. Thus when the plow is raised or lowered by manipulation of hand lever 17, rod 39 moves axially and hence shaft 35 is correspondingly slid in tube 40 and sleeve 29 respectively so that shaft 35 and plow carrier 1 move simultaneously and in substantially the same direction whenever lever 17 is actuated, and by adjustment in the effective length of links 20 and 42 the spacing above the carrier of the shaft and thus of the flail element at its lower end may be varied to suit whatever operating conditions may be encountered. Desirably the links are set to enable the flail element to strike the soil when in operation as this assists in disintegrating and pulverizing the soil crust above the plow but such adjustment of the element is not of course essential to the performance of its principal vine and weed removing functions.

The weeder flail element comprises the central cylindrical hub 37, pinned or otherwise fixedly secured to the lower end of shaft 35, and an outwardly projecting peripheral flange 37' provided with a plurality of circumferentially spaced holes; if, as heretofore suggested, a separate collar is not employed, the hub is grooved above the flange for reception of fork 38. The holes in the hub flange respectively receive pins 46 of a corresponding number of clevises 47 to each of which is attached one end of a short piece of fairly stiff wire rope 48 and to the outer or free end of each of these pieces is secured a substantially pear or drop shaped weight 49 of sufficient mass with relation to the stiffness of the rope to hold the latter taut when the weight is swinging freely in a circle about the shaft at its normal operating speed. Ordinarily four clevises and their attached pieces of wire rope and weights are provided and spaced at 90° intervals about the perimeter of the flange, but if desired a greater or fewer number of them may be used, the length of the several assemblies being substantially equal and preferably such that the rotating weights describe a circle whose diameter approximates the width of the conveyor.

The drive for shaft 35 through pulleys 31 and 33 and belt 32 is desirably such that the shaft, and hence the weeder element, is rotated at about 600–1000 R. P. M. while the harvester is moving along a row of growing potato plants or the like as the latter are progressively dug by the plow so that when the revolving pieces of wire rope with the weights attached to their ends engage the vines and weeds they flail or whip them from the potatoes and loosened soil. Due to the pear or drop shaped formation of weights 49 the vines as they are freed from the potatoes and soil by the impact of the ropes and are thrown by centrifugal force outwardly from the center of the weeder readily pass over the smooth tapered or "streamlined" outer surfaces of the weights and are then discharged substantially tangentially to the circle described by the latter and clear of the harvester on either side or are deposited in limp and broken condition on the ground ahead of the plow or else on conveyor 3. As the harvester continues to move forward those deposited ahead of the plow may again become engaged by the flail and be thrown clear while those initially thrown onto the conveyor either fall to the ground through the openings in the conveyor belt or are carried to the rear of the machine and then discharged to the ground.

As noted, it is usually advantageous to employ the weeder to assist in disintegrating and partially pulverizing the soil crust as well as remove the weeds and vines, and links 20 and 42 are therefore desirably adjusted in relation to the depth of plowing as determined by the positioning of hand lever 17 so that the revolving weights 49 strike or beat but do not appreciably penetrate the soil surface through a few degrees of their circular travel as the weeder moves along the row, the angularity of shaft 29 permitting them to thus contact the soil through a short arc at the front, yet swing clear of it in the remainder of their rotative path. Maximum efficiency in extraction of weeds and vines from the soil with the additional advantage of partial disintegration of the latter to facilitate subsequent passage through the interstices of the conveyor belt is thereby assured at minimum expenditure of power from the tractor.

While in the drawing I have illustrated the wire rope elements 48 as extending substantially in rectilinear directions from hub 37, it will be understood they normally assume this position only when shaft 35 is rotating since the ropes being somewhat flexible, are not capable of supporting the weights precisely normal to the axis of shaft 29 except under the influence of adequate centrifugal force; they are preferably stiff enough however to hold the weights clear of the plow and/or conveyor even when the shaft is not revolving.

From what has been said it will be evident that when the weeder is in operation in association with a plow as described, the combined beating of the soil crust by the flailing weights and the forward progress of the plow loosens and disintegrates the soil and tends to separate it from the root tendrils of the plants so that when the wire ropes of the weeder engage the plant stems they lift the entire plants and their root tendrils from the soil and then discharge them, usually without completely severing the stems, the potato tubers thus broken away from the feeding roots due to their greater resistance to movement through the loosened soil and/or their physical inertia remaining in the ground. The tubers therefore reach the conveyor substantially free of attached roots and other plant parts while any weeds or wholly unproductive crop plants encountered are removed entirely. In consequence my weeder affords material advantages over devices which merely cut or shear the plant stems and leave feeding roots and stubs of the stems in the soil and other plant parts upon it which must then be otherwise separated from the potatoes.

While I have herein referred specifically to potato harvesters, and to use of my weeder in operative association and combination therewith, it will be recognized the weeder may be used to advantage in harvesting many crops other than potatoes, including substantially all those generically designated "root crops" and thus not only those classed as tubers, of which potatoes are perhaps the best known example, but also corms, such as gladioli, bulbs such as onions and the several different bulb species grown primarily for their flowers and rhizomes such as iris, as well as such true root crops as carrots, beets, turnips and the like, while it may also be useful in connection with harvesting of peanuts which while not technically root crops do develope their mature pods below the soil surface; it may also be used in association with ground preparation or conditioning apparatus when no crop is being harvested.

Moreover it will be appreciated the mechanism herein shown and described for supporting and actuating the weeder shaft affords a substantially frictionless rotative drive for the shaft through the interposition of sleeve 29 between it and bearings 27, 28 while permitting belt 32 to be operated under adequate tension to prevent slippage whereby the shaft can be moved axially in the sleeve by operation of lever 17 without such binding as might occur if the pulley driving the shaft were mounted directly thereon, but other means for supporting, driving and adjusting the vertical position of the shaft may readily be devised and it may not be essential in all cases that it float in a rotating sleeve, particularly if other than a belt drive be employed, as it then may be feather-keyed directly in a driven rotatable part and any suitable means provided for moving it axially therein; my invention therefore expressly contemplates the provision of substantially any appropriate means for supporting, adjusting and operating the weeder element constructed in accordance therewith.

Thus while I have herein described the invention with considerable particularity as it may be embodied in a harvester of a specific type, it will be understood I do not thereby desire or intend to limit or confine myself thereto in any way as changes and modifications in form, construction, arrangement, relationship of the weeder to other parts of the harvester and of the several parts of the weeder to each other will readily occur to those skilled in the art and may be made if desired without departing from the spirit and scope of the invention as defined in the appended claims.

Having thus described my invention, I claim and desire to protect by Letters Patent of the United States:

1. In a weeder of the character described, weeder shaft supporting means, a shaft rotatably and axially movable therein, means for rotating the shaft at any position of axial adjustment in said supporting means, a collar on the shaft, means engaging the collar operable to move the shaft axially during its rotation, a plurality of weeder elements carried by the shaft adjacent one end thereof extending substantially radially therefrom, and a body of relatively large mass secured to the free end of each element operative when revolving about the shaft axis to maintain the element under substantial tension by centrifugal force.

2. In combination with a harvester comprising a forward ground engaging tool and an endless conveyor web adapted to receive from the tool soil separated thereby from the ground, a rotatable shaft extending upwardly from adjacent the forward end of the conveyor web substantially normal to the plane thereof, means supporting the shaft for rotation at any of a plurality of axially spaced positions, a plurality of weeder elements secured to the shaft adjacent its lower end in circumferentially spaced relation, each comprising a flexible tension element and a weighting element secured to the free end of the tension element, and means for rotating the shaft at velocity sufficient to maintain the tension elements under substantially constant centrifugal tension.

ALFRED STAUFFER.

REFERENCES CITED

The following references are of record in the file of this patent:

UNITED STATES PATENTS

| Number | Name | Date |
| --- | --- | --- |
| 1,263,965 | Twitchel | Apr. 23, 1918 |

FOREIGN PATENTS

| Number | Country | Date |
| --- | --- | --- |
| 370,694 | Germany | Mar. 6, 1923 |
| 513,384 | Germany | Nov. 27, 1930 |
| 519,928 | Germany | Mar. 5, 1931 |